United States Patent [19]
Lymons et al.

[11] Patent Number: 5,826,823
[45] Date of Patent: Oct. 27, 1998

[54] ACTUATOR AND SAFETY LOCK SYSTEM FOR PIVOTING DOOR THRUST REVERSER FOR AIRCRAFT JET ENGINE

[75] Inventors: Dennis E. Lymons, El Cajon; Michael R. Aten, San Diego, both of Calif.

[73] Assignee: Rohr, Inc., Chula Vista, Calif.

[21] Appl. No.: 597,761

[22] Filed: Feb. 7, 1996

[51] Int. Cl.$^6$ .................................................. B64D 33/04
[52] U.S. Cl. .................................. 244/110 B; 239/265.29
[58] Field of Search ................................ 244/110 B, 113; 414/558; 60/229, 230, 204, 226.2; 239/265.29, 265.33, 265.19; 292/341.16, 210

[56] References Cited

U.S. PATENT DOCUMENTS

| | | | |
|---|---|---|---|
| 3,024,771 | 3/1962 | Criffield et al. | 244/110 B |
| 3,172,549 | 3/1965 | Novotney | 414/558 |
| 3,531,049 | 9/1970 | Hom | 239/265.029 |
| 3,943,707 | 3/1976 | Nash | 239/265.29 |
| 4,422,605 | 12/1983 | Fage | 239/265.29 |
| 4,424,669 | 1/1984 | Fage | 244/110 B |
| 4,790,495 | 12/1988 | Greathouse et al. | 244/110 B |
| 4,827,248 | 5/1989 | Crudden et al. | 244/110 B |
| 5,615,834 | 4/1997 | Osman | 244/110 B |

FOREIGN PATENT DOCUMENTS

| | | | |
|---|---|---|---|
| 182858 | 3/1963 | Sweden | 244/110 B |

*Primary Examiner*—Galen L. Barefoot
*Attorney, Agent, or Firm*—Patrick J. Schlesinger

[57] ABSTRACT

An actuator and safety lock system for a pivoting door thrust reverser for an aircraft jet engine. An actuator having a plunger upon which an integral carriage is secured is slidably disposed upon a central guide rod which extends from the actuator. An over center link mechanism is pivotally secured to the carriage and to the thrust reverser doors so that upon movement from an extended position that locks the associated reverser doors in a locked position to a retracted position the doors are rotated to an open, deployed position. An actuator is positioned in each side beam of the fixed structure of a thrust reverser and provides a simple mechanism to operate a target type pivoting door thrust reverser and significantly reduces the bulk of such side beam and reduces the weight and aerodynamic drag of such side beam and contained mechanisms. A secondary lock system carried within each side beam provides pivoting latch members that cooperate with lock members provided at each corner of the forward end of each thrust reverser door to securely lock the thrust reverser doors in a stowed position. An actuator drives the latch members to an unlocked position to permit the lock members to be withdrawn when it is desired to deploy the doors. Proximity sensors are provided for each pair of latch members on each side beam to provide electrical signals representative of "latch engaged" and "door stowed" positions.

21 Claims, 6 Drawing Sheets

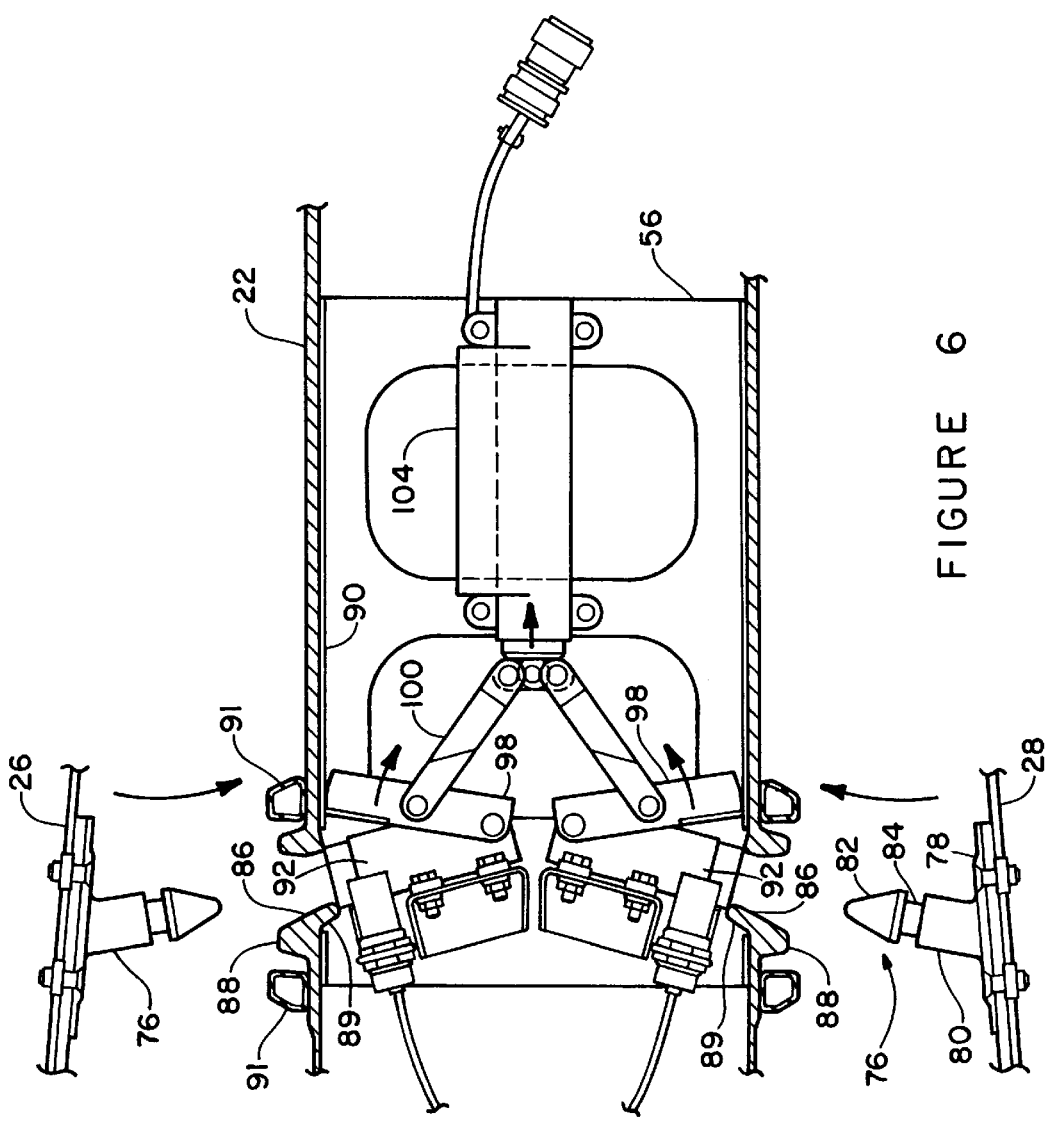

ACTUATOR AND SAFETY LOCK SYSTEM FOR PIVOTING DOOR THRUST REVERSER FOR AIRCRAFT JET ENGINE

BACKGROUND OF THE INVENTION

1. Field of the Invention

This invention relates to an improvement in thrust reversers and more particularly, but not by way of limitation, to a novel actuator and safety lock system for a pivoting door thrust reverser for an aircraft jet engine.

2. Description of the Prior Art

Thrust reversers for aircraft turbojet engines are well known in the art and serve to increase aircraft safety by providing a braking force to the aircraft when landing on wet or icy runways. Such thrust reversers may take the form of one or more thrust reverser doors pivotably attached to the engine nacelle which with its various components surrounding the engine provide what is known as an aircraft propulsion system. The thrust reverser doors are pivotally movable between a closed, forward thrust position and an open, reverse thrust position. When in their open position, such thrust reverser doors redirect the gases from the jet engine forwardly to provide a reverse thrust to the aircraft.

As may be imagined, serious consequences may result from an untimely displacement of the thrust reverser to its opened, thrust reversing position should such occur at any time other than during landing when the aircraft has landed and is rolling on the runway. Present day pivoting door thrust reversers are equipped with redundant safety systems to prevent such an occurrence. Typically, the thrust reverser doors are each fitted with a mechanical primary lock on the support structure and a mechanical secondary lock in the door actuator to prevent opening of the thrust reverser door in the event the primary mechanical lock should fail. However, the secondary mechanical lock is typically internally located within the actuator for a door and, should a malfunction in the secondary locking system occur, the thrust reverser door may operate in its normal fashion and hide the malfunction of the secondary mechanical lock. Thus, even redundant safety locking systems have fallen short of avoiding all possible risks to safeguard again the simultaneous failure of the primary and secondary mechanical locks.

Some lock systems additionally have a further safety device to preclude any possible opening of the thrust reverser door by blocking any hydraulic fluid flow from the actuator when the thrust reverser door is in the closed, forward thrust position. Such a system entails a rather complex hydraulic system requiring additional means to protect portions of the thrust reverser hydraulic control system against over pressurization when in the locked mode. Further, the location of such a safety device in the internal mechanical system of the actuator may itself give rise to an undetected malfunction.

Typical examples of such known prior art safety lock systems for thrust reversers may be found in U.S. Pat. Nos. 5,310,117; 5,381,654; and 5,431,085.

The aforementioned U.S. Pat. No. 5,310,117 is directed to a thrust reverser having two pivoting doors which reverse thrust in the well known target door arrangement. Hooks 26 and 27 releasably engage fingers on the doors to retain the doors in a stowed position. This patent also illustrates a typical prior art two door thrust reverser installation in which actuators are positioned in side beams of a fixed structure of a nacelle and operate through various complicated linkages and guide members to pivot the thrust reverser doors. U.S. Pat. No. 5,392,991 is another example of such arrangement.

The problem with such arrangements is that the stang fairings to enclose such actuators and associated safety lock systems are bulky, heavy and intrude into the air flow of the aircraft thereby also creating undesired drag. A need therefore exists for an actuator and safety lock system for a pivoting door system that is simple, light weight and more reliable than the prior art systems now available. The aerodynamic aspects of such prior art systems need significant improvement and the redundant safety systems need to be simplified to provide maximum protection against undesired deployment in flight. Accordingly, it is an object of the present invention to provide an actuator and safety lock system for a pivoting door thrust reverser that overcomes the shortcomings of the prior art devices by providing a novel actuator that is simple in design, has few parts, and occupies a minimum of space in a side beam to open and close associated thrust reverser doors and to provide a primary lock for the thrust reverser. This novel actuator acts in concert with a unique safety system to provide a redundant safety system that effectively precludes deployment of the thrust reverser at an undesired time.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. Briefly stated, a preferred embodiment of the present invention provides an actuator and safety lock system for a pivoting door thrust reverser for an aircraft jet engine having at least two pivoting thrust reverser doors and includes an annular fixed structure secured to the aft end of an aircraft jet engine and which cooperates with such thrust reverser doors when the doors are secured in a stowed position to provide an exit nozzle for the jet engine. The annular fixed structure including two spaced opposed longitudinally extending side beams, each of which side beams has an outwardly opening interior cavity, with the opposed arcuate thrust reverser doors being hingedly secured at the aft end to such side beams. A hydraulic actuator is positioned within the cavity of each side beam and is provided with a central longitudinally extending guide rod, preferably having at least one longitudinal planar surface, upon which a piston member is reciprocally mounted for movement thereon. The piston member is provided with an integral carriage that is connected by means of an over center link means to the aft portion of at least one thrust reverser door to provide a primary lock for such door. The piston member and integral carriage are reciprocally positioned between a door stowing position and a door deployed position.

At least one lock member is carried at each corner of the forward end of each thrust reverser door and is received in a cylindrical member provided in the side beam. An actuator which is normally biased to a closed position is hingedly connected to a latch member which is, as the lock member is inserted into the cylindrical member, rotated into a locking connection with the lock member. The actuator is preferably an electrically powered ball screw actuator that is normally biased to a door stowed position. Thus, the over center linkage between the carriage of the thrust reverser actuator and door provides a primary lock for the thrust reverser doors and the electrically controlled latch locking the lock member carried by a thrust reverser door provides a redundant secondary lock.

The foregoing has outlined rather broadly the more pertinent and important features of the present invention in order that the detailed description of the invention that follows may be better understood so that the present contributions to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

The foregoing and other features and advantages of the present invention will become more readily appreciated as the same becomes better understood by reference to the following detailed description of the invention when taken in conjunction with the accompanying drawings, wherein:

FIG. 6 is an additional schematic view showing the secondary lock system in an unlocked condition to permit the thrust reverser doors to be pivoted to an open, deployed position.

FIG. 7 is a cross section detail showing the receipt of a lock member in the cylindrical member for latching of the door.

DETAILED DESCRIPTION OF THE PREFERRED EMBODIMENT

Figure 1:
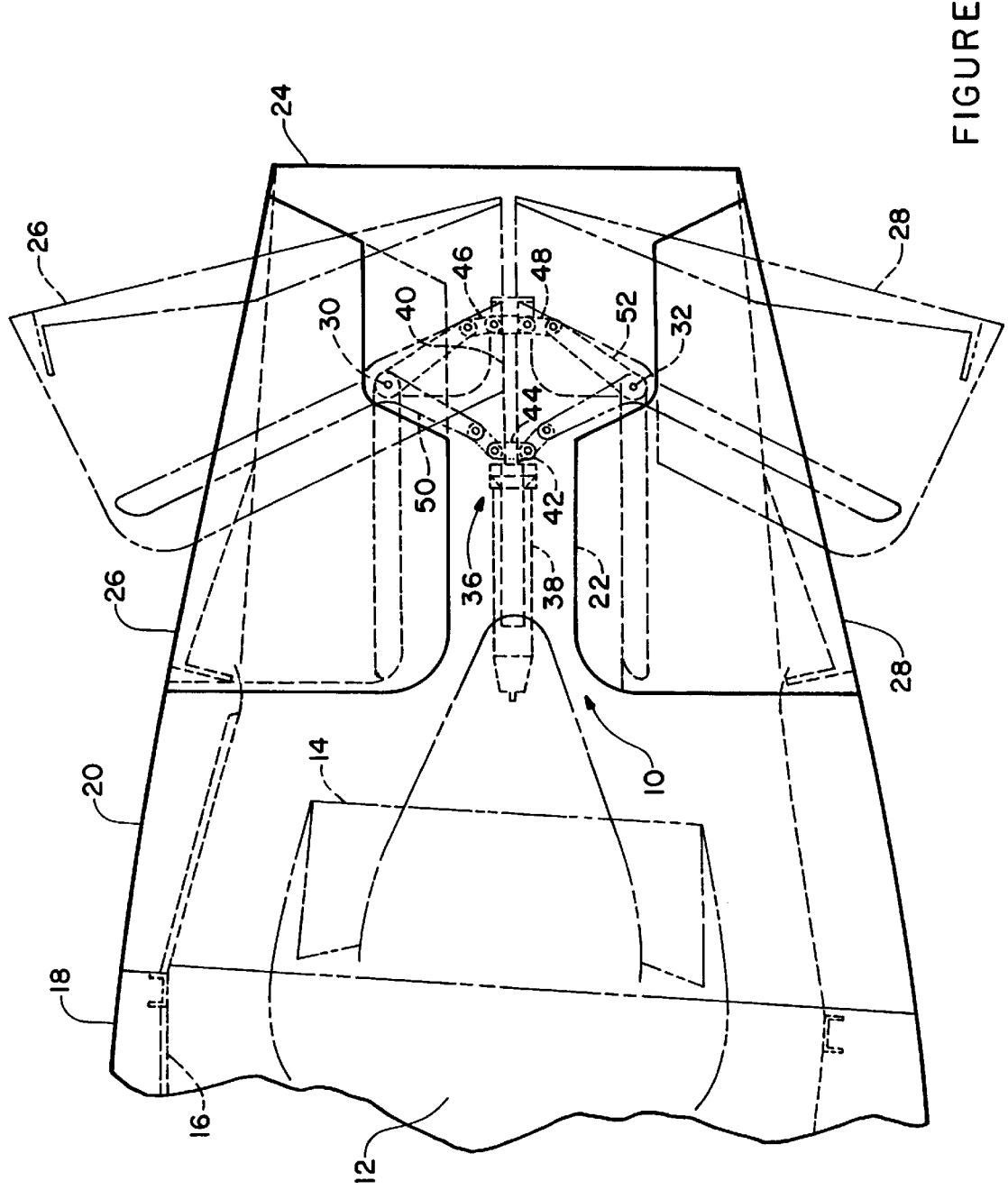
FIG. 1 is a simplified schematic representation of an aircraft gas turbine engine having a thrust reverser provided with a preferred embodiment of the present invention.
Figure 2:
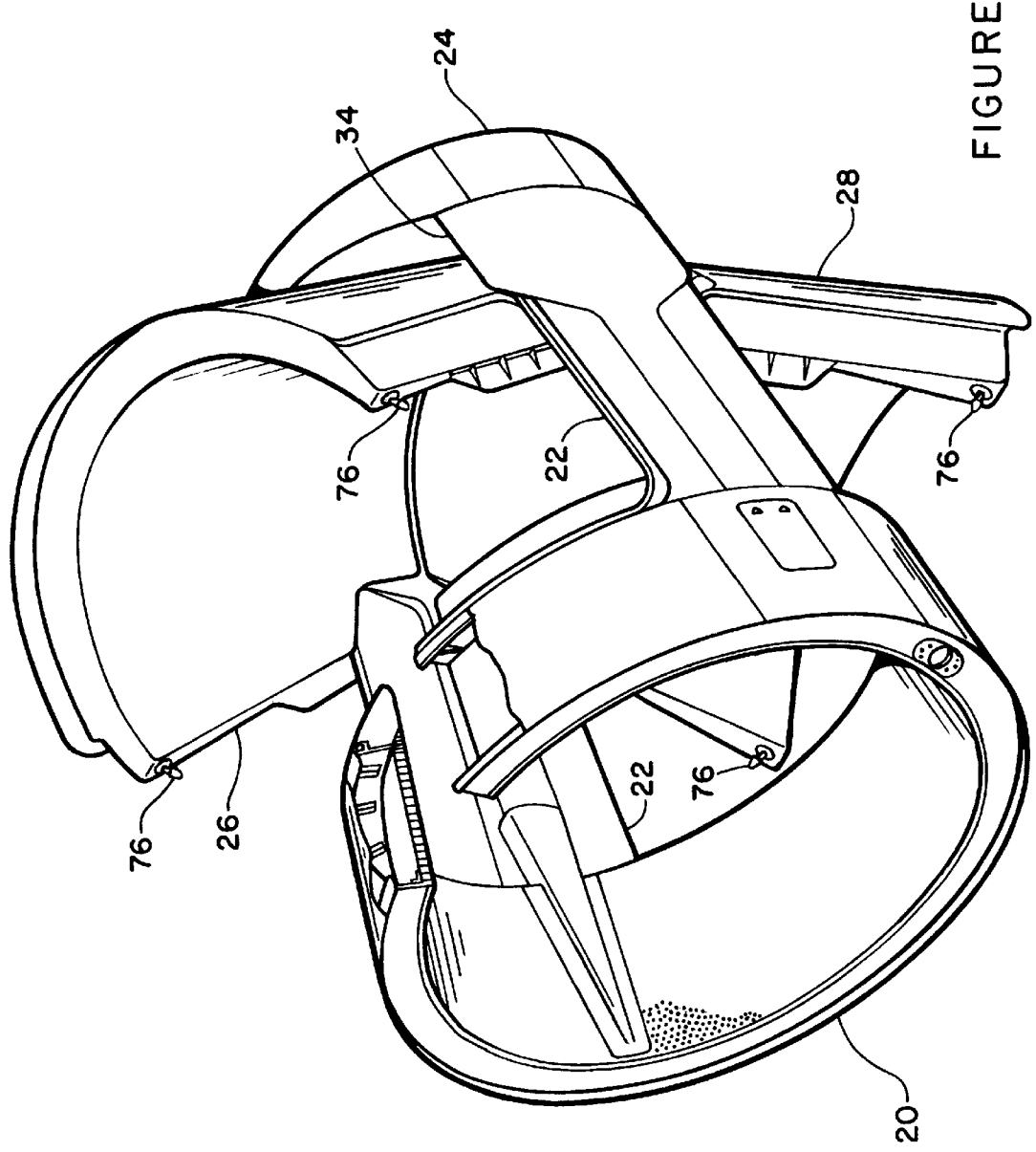
FIG. 2 is a perspective of the thrust reverser shown in FIG. 1 in a deployed position.

Referring to the drawings in detail, and particularly to FIG. 1 and 2 reference character 10 generally designates an actuator and safety lock system for a pivoting door thrust reverser for an aircraft jet engine that is constructed in accordance with a preferred embodiment of the present invention. The system 10 is illustrated being used preferably with an aircraft jet engine 12 of the bypass type. The hot core gas of the engine 12 issues from the exit 14 of the engine. The bypass air flows through a duct 16 provided by a suitable cowl component 18 of the nacelle surrounding the engine 12. An annular fixed structure 20 is suitably secured to the cowl 18 and includes opposed side beams 22 that terminate in an annular aft portion 24. Each side beam has an outwardly opening interior cavity for receiving the mechanisms of the present invention.

Upper and lower thrust reverser doors 26 and 28 are pivotally secured to the side beams 22 by fixed pivots 30 and 32 respectively. The thrust reverser doors 26 and 28 are shown in both their closed, stowed position and their open, deployed position. The cavity of each side beam 22 is covered by a suitable aerodynamically shaped fairing 34 which enhances a smooth flow of air over the outer surface of the fixed structure 20. It will be noted in FIG. 1 that the fixed structure 20 and the thrust reverser doors 26 and 28 cooperate with the engine 12 to provide a smooth exit nozzle for the commingled hot gas and cold bypass air flowing from the engine 12.

Although subject to more detailed description hereinafter, it should be noted that an hydraulic actuator 36 is provided in each side beam 22 for moving the thrust reverser doors 26 and 28 between a closed, stowed position and an open, deployed position as seen in FIG. 1. Each thrust reverser actuator 36 includes a tubular actuator body 38 and a central guide rod 40 which extends longitudinally from within the actuator body 38. An hydraulic piston member 42 is mounted on the rod 40 for reciprocal movement thereon and is provided with an integral carriage 44 that is hingedly connected by stub links 46 and 48 to fixed link members 50 and 52 that extend generally aft from their points of securement to the thrust reverser doors 26 and 28. No details of the interior construction of the actuator 36 are shown since such are conventional as is the associated hydraulic system. It will be seen that the connection of the aforesaid link members from the integral carriage 44 of the actuator 36 to the doors 26 and 28 provide an over center connection that acts as a primary lock for the thrust reverser doors 26 and 28. It should also be noted that as seen in such noted Figures that while the sub links 46 and 48 are very slightly canted forward at their connection to the fixed links 50 and 52 for a purpose to be described in detail hereinafter. The carriage 44 is fully extended on the guide rod 40 in the closed, stowed position so that interior forces exerted by the exhaust of the engine 12 cannot urge the doors 26 and 28 open since the stub links 46 and 48 are positioned transversely to the axis of the fixed structure 20. Accordingly, the doors 26 and 28 cannot be opened until the plunger 42 and the integral carriage 44 are retracted so that the associated link members 46 and 48 are rotated outwardly to open the doors 26 and 28.

Figure 3:
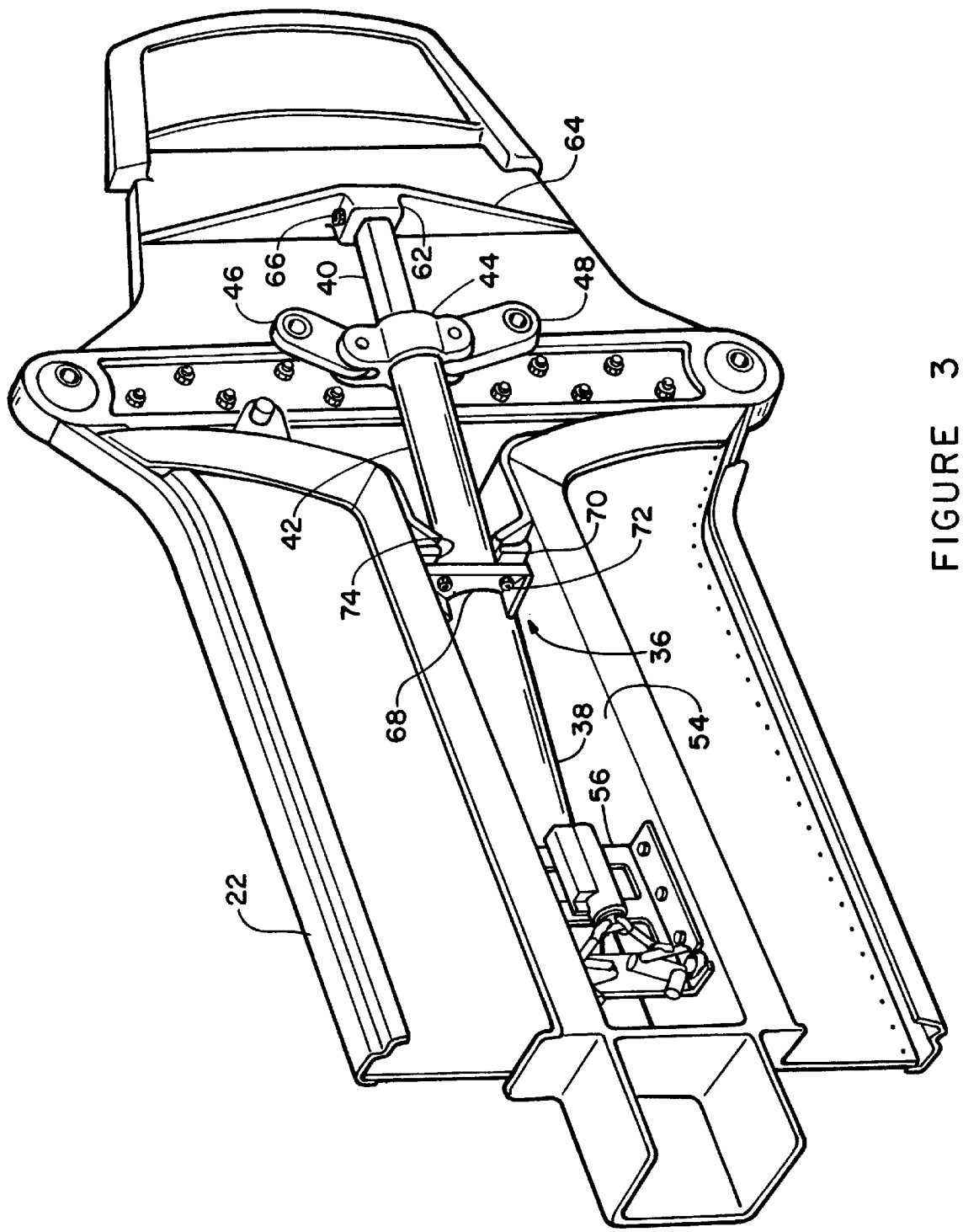
FIG. 3 is a perspective of a side beam of the thrust reverser provided with the novel invention.
Figure 4:
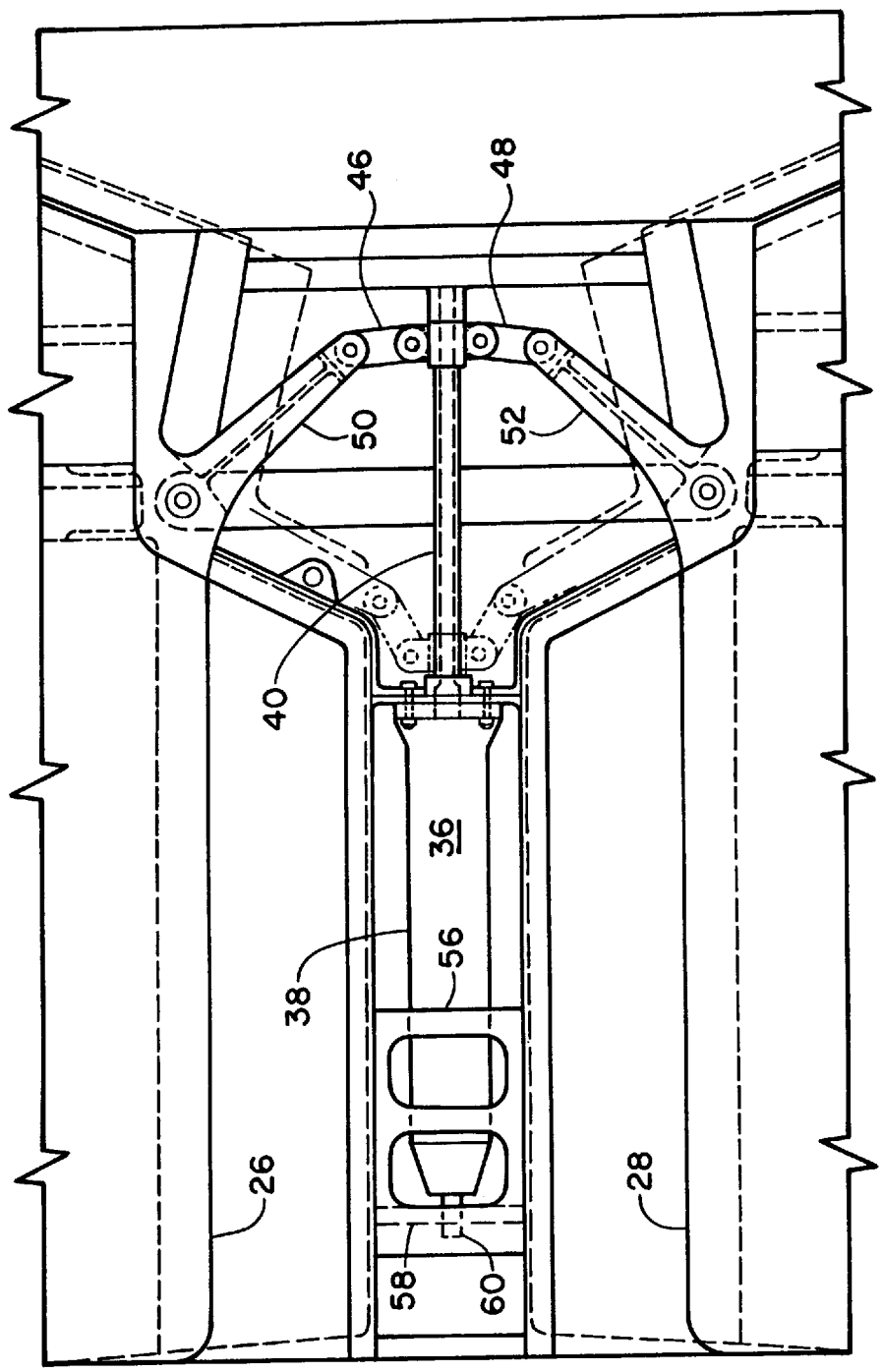
FIG. 4 is a simplified schematic view illustrating the cooperation of the thrust reverser actuator and the associated thrust reverser doors.

Referring now to FIGS. 3 and 4, further details of the cooperation of the thrust reverser actuator 36 with the doors 26 and 28 will be illustrated as well as the positioning of a thrust reverser actuator 36 within a side beam 22. Each side beam 22 is constructed of certain castings and other metal members that are conventionally attached in accordance with the usual practices of the aircraft industry. Each side beam 22 is provided with an interior cavity 54 that is closed, as seen in FIG. 2, by a suitable fairing 34. Each side beam 22 is provided with a transversely extending web portion 58, see most clearly in FIG. 4, that receives the forward attachment 60 of the thrust reverser actuator body 38. The guide rod 40 which extends inwardly into the reciprocal plunger 42 also extends outwardly to be received by a complementary fitting 62 provided on a web 64 of the side beam 22 and is secured therein in a suitable manner, such as by a bolt and nut arrangement 66.

The actuator body 38 is provided at its aft end with a flange 68 that is secured to a web 70 provided in the side beam 22 in a suitable manner, as by bolts 72. The web 70 is provided with an outwardly opening slot 74 for receiving the reciprocal plunger 42. It will be appreciated that the present construction provides ease of assembly in that the guide rod 40 is positioned in the fitting 62 and the attachment 60 of the body 38 is made to the web 58 after the plunger 42 has been slipped into the slot 74. The bolts 72 then connect the body 38 to the web 70.

Some observations should be made concerning the construction of the thrust actuator 36 and its cooperation with the thrust reverser doors 26 and 28. It is preferred that the actuator body 38 and the piston 42 be provided with maximum diameters that may be accommodated within the side beam so as to provide maximum side load capability for the actuator 36. It should also be noted that the cross section configuration of the guide rod 40 is provided with at least one planar surface to preclude twisting of the piston 42 and the integral carriage on such rod 40. The preferred embodiment of the invention 10 provides for the guide rod 40 to have at least four planar longitudinal surfaces, which surfaces may without limitation provide a generally square cross section configuration.

While the carriage 44 is referred to as integral to the piston 42, it is to be understood that in construction the carriage 44 may be threadedly connected to the piston member 42 in a suitable manner. The actuator body 38 is used as a stressed member of the actuator 36 member and thereby reduces the construction to which the actuator is secured and which is generally termed in the art as the "birdcage". Thus, the construction of the present invention permits a short birdcage structure to be utilized.

Referring now to FIGS. 2 and 5 to 9, the details of the safety lock feature of the present invention will be described. It will be seen that the four door latches of the safety lock system provide a dual purpose. In addition to providing a redundant stow position locking for the thrust reverser doors, they also provide lateral restraint against door deflection due to internal fan duct pressures exerted by the gas stream issuing from the exit 14 of the engine 12. In FIG. 2 it will be seen that an outwardly extending lock member 76 is provided at each corner of the forward end of each of the thrust reverser doors 26 and 28. Each lock member 76 includes a base flange member 78 that is secured to a thrust reverser door in a suitable manner, as by bolting, and a canted body member 80 that has a generally cone shaped head 82. The body member 80 is provided with an intermediate relieved portion 84 for a purpose that will be hereinafter described in detail.

Figure 5:
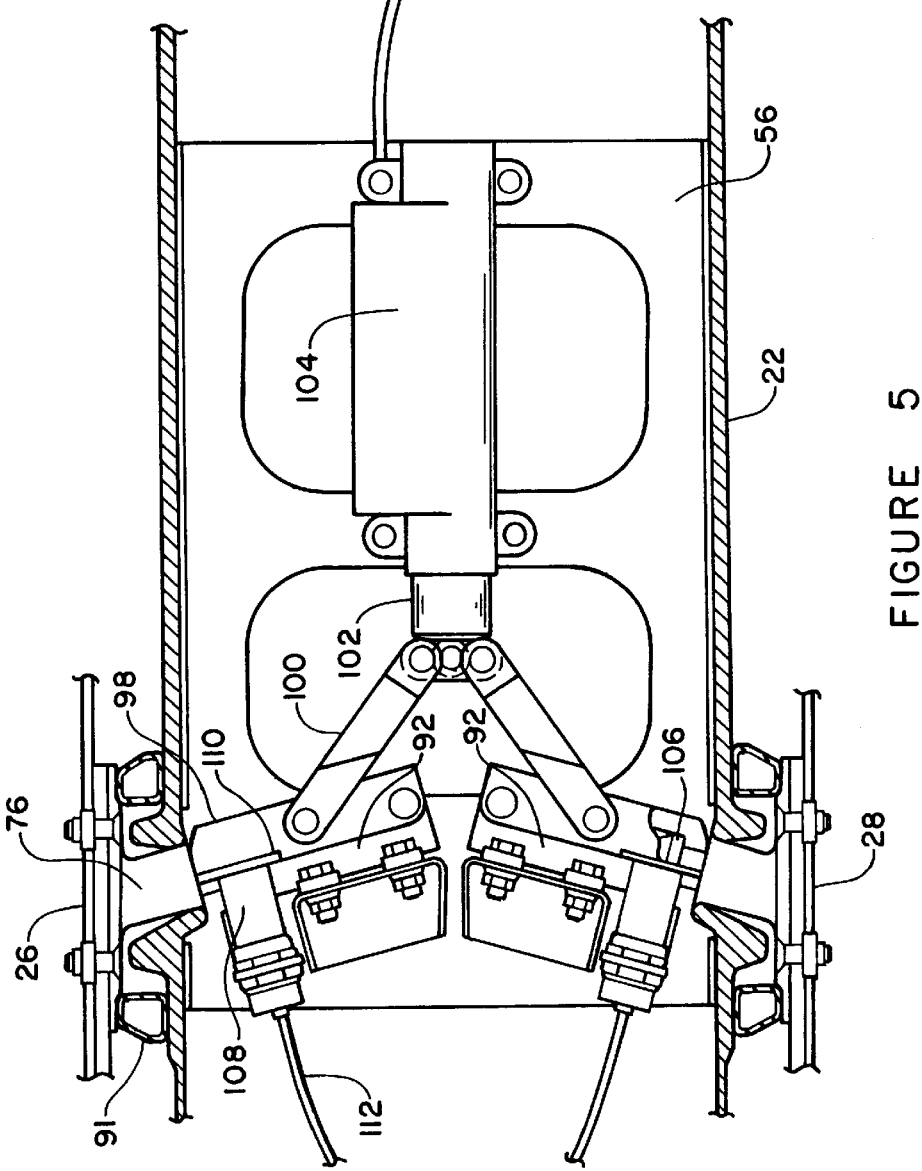
FIG. 5 is a schematic view showing the secondary lock system locking thrust reverser doors in a stowed, closed position.

Each lock member 76 is received through an aperture 86, surrounded by an outwardly extending shoulder 88 and an inwardly extending shoulder 89, that are provided in opposing spaced flanges 90 of the side beam 22. It should be noticed that the outwardly extending shoulder 88 is configured to cooperate with the cone shaped portion 82 of the lock member 76 to ensure that the cone portion 82 is guided into the aperture 86 and to limit the inward movement of the doors 26 and 28 against spaced seals 91, seen in FIGS. 6 and 7, during the unlocking procedure. The body member 80 is sized to fill the aperture 86 without binding. Each lock member 76 is received in the closed, stowed position in a cylindrical bushing 92 wherein the head 82 is received in a receiving member 94 that is biased in a predetermined manner by spring 96 as seen most clearly in FIG. 7. It is seen in FIG. 5, that the receiving members 94 extend into contact with the inner shoulders or bosses 89.

Figure 8:
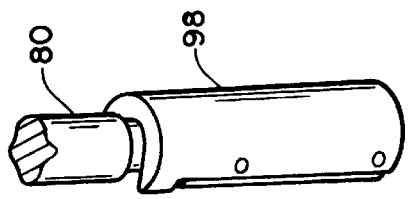
FIG. 8 is a perspective of a greatly simplified illustration of a latch member engaging a lock member.
Figure 9:
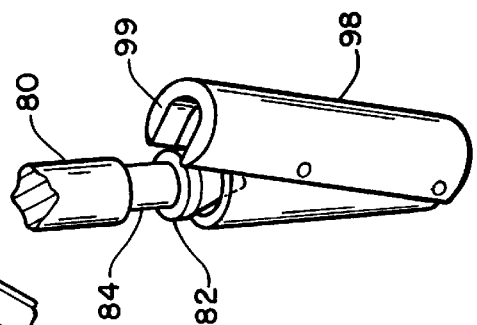
FIG. 9 is a perspective of a greatly simplified illustration a latch member disengaged from the lock member.

The side beam 22 is provided with a longitudinally extending web member 56 that is mechanically attached in a suitable manner, as by bolts, to the side beam 22. Each cylindrical member 92 is secured to the web 56 in a suitable manner. A latching member 98 is hingedly secured to each bushing 92 and is also hingedly secured to a link member 100 that is pivotally connected to a reciprocal plunger 102 of an actuator 104. In FIG. 5 it will be seen that each latch member 98 is provided with a relieved portion 106 that is shaped complementarily to the lock member 76 and the relieved portion 84 and cooperates therewith to provide locking engagement. Also, as seen in FIGS. 8 and 9, the horse shoe shaped collar 99 provided at the end of the latch member 98 is received in locking general type of locking arrangement engagement in the recess 84 of the lock member 76. The general type of locking arrangement of the latching member 98 and the lock member 76 is described in greater detail in U.S. Pat. No. 4,629,146, entitled "Hold Open Rod For Hinged Section Of Nacelle System" which describes holding open a hinged section of a nacelle for maintenance purposes, the teachings of which are incorporated herein by reference.

Each actuator 104 in the preferred embodiment is an electrically controlled, three phase, direct current, brushless motor that drives a precision ball screw to control the reciprocal movement of the plunger 102. The actuator 104 is provided with an internal spring that, if the electrical power to the motor is interrupted, drives the plunger 102 to the extended position.

A suitable proximity sensor 108 is secured to the web 56 adjacent to each latch member 98. Each latch member 98 is provided with a suitable plate 110 that cooperates with a proximity sensor 108 to provide an electrical signal on cable 112 coupled to the sensor indicating that the latch member 98 has latched the associated lock member 76 in a closed, stowed position. Each proximity sensor 108 will be seen to provide dual functions. As will be discussed more fully hereinafter, the follower portion 94, as seen in FIG. 6, precludes a latch member 98 from reengaging a lock member 76 until an associated thrust reverser door has achieved the stowed position. Thus, the latch position sensors actually provided both a "latch unlocked" and "door not stowed" indication. Further, the position sensors 108 on each side frame 22 provide redundant first and second channels for indicating that the thrust reverser doors have been stowed and latched.

To briefly review the operation of the safety lock system, it is seen in FIG. 6 that actuation of the actuator 104 draws the plunger 102 to a retracted position and rotates the latch members to pivot away from locking engagement with the lock members 76 thereby permitting the actuator 36 to rotate the doors 26 and 28 from a closed, stowed position to an open, deployed position. This operation is initiated by pilot selection of reverse thrust and application of power to the latch release actuators 104. However, the latch members 98 will not initially release since the latches are loaded by fan duct pressure and door seal loads acting through the deflector doors. Pilot selection of reverse thrust also causes hydraulic pressure to be directed the main thrust reverser actuators 36. As the hydraulic actuators 36 retract the thrust reverser door linkage forwardly to the on-center center position, the doors over stow slightly relieving the door latch loads because the stub links 46 and 38 as they are drawn forwardly will initially push the connected fixed links 50 and 52 rearwardly to initially slightly over stow such doors. When the latch load is relieved, the lost motion springs within the actuator 104 drive the latch members 98 to the unlocked position. When the lock members 76 are withdrawn from locking engagement with the latches 98, as seen in FIG. 6, the follower springs 96 will drive the followers 94 partially out of the latch support fittings until they abut the bosses 89 on the thrust reverser side frames 22, as seen in FIG. 6

It should be noted at this point removal of electrical power from the latch release actuators, either during normal stow operation or in the event of power failure, will allow the latch return spring contained with the actuator 104 to extend the latch release actuator 104. The pivoting latches 98 will attempt to return to the latched position, as seen in FIG. 5. However, they will be prevented from returning to the fully latched position by the followers 94 which fill the gap between the trigger support fittings and the shoulders 89 on the thrust reverser side frames 22.

When it desired to stow the doors 26 and 28, the actuator 36 extends the carriage 44 to rotate the associated doors toward a stowed position. As the doors 26 and 28 approach the stowed position, the door locating lock members 76 provided at each forward corner of the doors contact the followers 94 and depress them against the springs 96. The followers 94 are depressed until their largest diameter clears the end of the bushing 92 to permit the rotating latch members 98 to engage the reduced diameter groove 84 on each lock member 76. The lock members 76 are then securely locked by the cooperating latch members 98. Upon locking, the proximity sensor target 110 then cooperates with the associated sensor 108 whereby signals representative of "door stowed" and "latch engaged" conditions are transmitted by a pair of sensors 108.

Since, on a given side both latch trigger elements 98 are attached to a common actuator 104, when an upper latch member is released, the lower latch member is also released. Therefore sensor duplication is achieved by using an upper latch sensor for one signal channel, and the lower latch sensor for the other channel thereby minimizing the number of sensors required for adequate indication of thrust reverser position.

The present invention has also given consideration to properly treating the loads imposed on the components of the invention in use. Lateral loads exerted by the thrust reverser doors 26 and 28 on the lock members 76 are reacted directed against the side walls of the apertures 86 in the thrust reverser side frame 22 and do not go into the latch members 98. Duct pressure and seal loads (door opening loads) are shared between the door corner latches and the over-center linkage mechanism. The portion of the door opening loads which are shared by the corner latch members 98 go from the lock members 76 (tension/shear), to the horse shoe shaped collars 99 on the latch members 98 (shear/compression), directly into the thrust reverser side frames 22 (compression) since the collars 99 bear directly against the shoulders 89. Adequate diametral clearance is provided at the latch member pivot points to avoid loading of the trigger pivots, support housings, and the like.

The invention may be embodied in other specific forms without departing from the spirit and essential characteristics thereof The present embodiments are therefore to be considered in all respects as illustrative and not restrictive, the scope of the invention being indicated by the appended claims of the invention being indicated by the appended claims rather than by the foregoing description, and all variations, substitutions and changes which come within the meaning and range of equivalency of the claims are therefore intended to be embraced therein. For example, while the disclosed invention is illustrated as having particular application to a two door target reverser the present invention has equal application to pivoting door thrust reversers that utilize more than two doors. Additionally, although the preferred embodiment for the latch release actuator is shown to be an electrical motor and ball screw actuator, other forms of actuators, including hydraulic or pneumatic will be considered to have equal application.

What is claimed is:

1. An actuator and safety lock system for a pivoting door thrust reverser for an aircraft jet engine having at least two pivoting thrust reverser doors and comprising:

an annular fixed structure secured to the aft end of an aircraft jet engine and cooperating with at least two thrust reverser doors, when the doors are secured in a stowed position, to provide an exit nozzle for the jet engine;

the annular fixed structure including two spaced opposed longitudinally extending side beams, each of which side beam has an interior cavity, with the opposed arcuate thrust reverser doors being pivotally secured at their aft ends to said side beams;

a hydraulic actuator positioned within the cavity of each side beam and having a tubular main body that is provided with a central longitudinally extending guide rod upon which a carriage means is reciprocally positioned for movement between a door stowed position and a door deployed position;

over center link means hingedly secured to each carriage and to an aft portion of each thrust reverser door;

at least one lock member carried at a corner of the forward edge of each thrust reverser door, and actuateable lock means positioned on a side beam of the fixed structure and cooperating with said at least one lock member to releasably lock a thrust reverser door in its stowed position.

2. The system defined in claim 1 which further includes fitting means provided on the side beam to secure the actuator and guide rod thereon.

3. The system defined in claim 2 wherein the fitting means includes a first fitting to receive the exposed distal end of the guide rod and additional fitting means to secure the actuator body to said side beam.

4. The system defined in claim 2 wherein the guide rod is provided with at least one planar longitudinally extending surface which cooperates with a complementarily shaped surface provided in the carriage means.

5. The system defined in claim 2 wherein the cross sectional shape of the guide rod includes at least four planar surfaces and the associated carriage is provided with a complementary shaped surfaces whereby the carriage may be reciprocated on said guide rod without experiencing any tendency to rotate on such rod.

6. The system defined in claim 2 wherein the cavity provided in the side beam is completely covered by an aerodynamically shaped fairing.

7. The system defined in claim 2 wherein the lock member is provided with a relieved portion at a predetermined intermediate longitudinal position and the lock means includes a hingedly secured latch member that is provided with a portion that is receivable in said relieved portion of the lock member and cooperates therewith to lock the thrust reverser door when such door is positioned in a fully stowed position.

8. The system defined in claim 7 which further includes latch actuator means that is operatively coupled to the latch member and which is biased to a normally stowed position for the associated thrust reverser door.

9. The system defined in claim 8 wherein the latch actuator means includes electrical means driving a ball screw coupled to latch members, the latch actuator means being normally biased to a position representative of a stowed position for the associated thrust reverser door.

10. The system defined in claim 9 which further includes at least a first position sensor positioned adjacent to the latch means and cooperating therewith to provide an electrical signal representative of the position of the latch member and the position of an associated thrust reverser door.

11. The system defined in claim 10 which further includes a second position sensor whereby the first position sensor provides an electrical signal for a first signal channel and the second position sensor provides an electrical signal for a second signal channel.

12. A method for actuating thrust reverser doors to stowed and deployed positions and for providing a redundant safety lock system for such doors after they have been actuated to a stowed position for a thrust reverser for an aircraft jet engine propulsion system having a fan air stream and which includes an annular fixed structure that is secured to the aft end of an engine and which cooperates with at least two thrust reverser doors that are pivotally secured to spaced opposing side beams of such fixed structure, which method comprises the steps of:

positioning an hydraulic actuator body within each side beam, each actuator body having a central reciprocal plunger slidably positioned therewithin;

providing a central guide member for the reciprocal plunger within each actuator body;

mounting a carriage means on such reciprocal plunger for cooperation with the actuator body to provide selective reciprocal movement of such carriage means on such guide member;

providing a driving link connection between the carriage means and each thrust reverser door:

selectively driving the carriage means along the guide member to a retracted position to cause an associated thrust reverser door to be pivoted to a thrust reversing position for the jet engine, and selectively driving the carriage means along the guide member to an extended position to cause said driving link connection to pivotally drive said associated thrust reverser door to a stowed position for permitting maximum thrust of the engine "by positioning said driving link connection in an over-center position thereby providing a primary lock to resist an undesired opening of said thrust reverser door in flight, and providing a secondary lock separated from said primary lock by releasably locking each thrust reverser door in the stowed position at each side of its forward portion and thereby providing lateral restraint against blocker door deflections due to internal pressure from said fan air stream.

13. The method of claim 12 which further includes the steps of securing a distal end of the guide member to the side beam at a first location and securing the actuator body to the side beam at least at a second spaced location whereby the carriage means may reciprocate intermediately between said first and second locations.

14. The method of claim 12 which further includes the step of providing the guide member with at least one non-planar longitudinally extending surface.

15. The method of claim 14 which further includes the step of providing the guide member with a uniform generally square cross section.

16. The method of claim 14 which further includes the step of covering an open side of each side beam with an aerodynamic fairing to reduce drag of the side beam when the aircraft engine is in flight.

17. A method for actuating thrust reverser doors to stowed and deployed positions in cooperation with a safety lock system for such doors after they have been actuated to a stowed position for a thrust reverser for an aircraft jet engine propulsion system having a fan air stream and which includes an annular fixed structure that is secured to the aft end of an engine and which cooperates with at least two thrust reverser doors that are pivotally secured to spaced opposing side beams of such fixed structure, which method comprises the steps of:

providing at least one externally extending lock member in each side of a forward portion of each thrust reverser door;

securing to each side beam a hinged latch member which is selectively pivotable to engage each lock member;

providing an actuator which is operatively coupled to each hinged lock member that is responsive to a command to unlock each said latch member from each lock member to permit the associated thrust reverser door to be pivoted to a deployed thrust reversing position and that is responsive to a command to the latch member to locking engage the lock member, and selectively directing operative commands to the actuator whereby the latch member is unlocked from engagement with the lock member or the latch member locking engages the lock member.

18. The method of claim 17 which further includes the steps of providing an annular relieved portion on an intermediate portion of each lock member and providing a complementarily horseshoe shaped portion on each latch member whereby a latch member may lockingly engage a lock member.

19. The method of claim 18 which further includes biasing said actuator to a normally locking position for locking the associated door in a stowed position and driving, upon command, the latching member to a retracted position to thereby permit the associated thrust reverser door to be pivoted by a thrust reverser door actuator to a thrust reversing position for the engine.

20. The method of claim 19 which further includes the step of providing a tubular housing means having a biased central member which interferingly precludes said latching member from moving to a latching position until the lock member drives said central member into such tubular housing and out of such interfering position on each side beam of said fixed structure for receiving a lock member for locking engagement with an associated latching member.

21. The method of claim 18 which further includes the step of providing position sensors on said side beam in proximity to the latching members whereby signals representative of door stowed and latch engaged conditions may be generated by a predetermined proximity of each latching member to each associated sensor.

* * * * *